US010839698B1

(12) United States Patent
Chaubey et al.

(10) Patent No.: US 10,839,698 B1
(45) Date of Patent: Nov. 17, 2020

(54) METHODS AND SYSTEMS FOR DEPICTING AN ENERGY STATE OF A VEHICLE

(71) Applicant: Honeywell International Inc., Morris Plains, NJ (US)

(72) Inventors: Rajesh Chaubey, Bangalore (IN); Ratan Khatwa, Morris Plains, NJ (US); Daniel Lewis, Morris Plains, NJ (US); Rajeev Mohan, Bangalore (IN); Ramkumar Rajendran, Theni District (IN)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 16/444,717

(22) Filed: Jun. 18, 2019

(51) Int. Cl.
G08G 5/00 (2006.01)
B64D 43/00 (2006.01)

(52) U.S. Cl.
CPC .......... G08G 5/0047 (2013.01); B64D 43/00 (2013.01)

(58) Field of Classification Search
CPC .............................. G08G 5/0047; B64D 43/00
USPC ............ 340/961, 973–975; 701/14, 16, 120; 342/29, 33, 36
See application file for complete search history.

(56) References Cited

U.S. PATENT DOCUMENTS

| 4,536,843 | A | 8/1985 | Lambregts |
| 8,527,173 | B2 | 9/2013 | Lacoste et al. |
| 8,723,693 | B1* | 5/2014 | Cahoon ................. B64D 43/00 340/968 |
| 8,774,989 | B1 | 7/2014 | Bush et al. |
| 8,996,204 | B2 | 3/2015 | Ishihara et al. |
| 9,734,724 | B2 | 8/2017 | Zammit et al. |
| 9,891,632 | B1* | 2/2018 | Irwin ..................... B64D 43/00 |
| 2006/0200279 | A1 | 9/2006 | Ainsworth et al. |
| 2010/0036552 | A1 | 2/2010 | Pepitone et al. |
| 2012/0150369 | A1* | 6/2012 | Giovannini .......... G08G 5/0021 701/18 |
| 2013/0151039 | A1* | 6/2013 | Haillot ................... B64D 41/00 701/3 |
| 2014/0257602 | A1* | 9/2014 | Gaston ................... G08G 5/025 701/16 |
| 2014/0368359 | A1 | 12/2014 | Johnson et al. |
| 2015/0197335 | A1* | 7/2015 | Dekel ................. B64C 29/0033 701/5 |
| 2015/0276428 | A1* | 10/2015 | Constans ............. G01C 23/005 701/14 |
| 2015/0329957 | A1* | 11/2015 | Anthony ............... C23C 14/048 427/526 |
| 2016/0063867 | A1* | 3/2016 | Zammit ............... G08G 5/0039 701/18 |
| 2017/0138759 | A1* | 5/2017 | Turner ................. G08G 5/0021 |
| 2017/0158349 | A1* | 6/2017 | Scacchi ................. B64D 43/00 |

(Continued)

Primary Examiner — Ojiako K Nwugo
(74) Attorney, Agent, or Firm — Bookoff McAndrews, PLLC

(57) ABSTRACT

Methods and systems are disclosed for depicting an energy state of a vehicle. One method comprises receiving, by a flight management computer, a plurality of vehicle parameters associated with the vehicle and determining a flight plan associated with the vehicle. Then, the flight management computer identifies a point of interest in the flight plan and determines one or more trajectories associated with the flight plan. Based on the one or more trajectories, an actual energy height and a desired energy height at the point of interest are determined and displayed to a vehicle operator.

19 Claims, 12 Drawing Sheets

(56) References Cited

U.S. PATENT DOCUMENTS

| | | | | |
|---|---|---|---|---|
| 2017/0358226 A1* | 12/2017 | Hodges | ................ | G05D 1/0061 |
| 2018/0079495 A1* | 3/2018 | Jayathirtha | ............ | B64D 45/00 |
| 2018/0238708 A1* | 8/2018 | He | ...................... | G01C 23/005 |
| 2018/0370645 A1* | 12/2018 | Durand | ................ | G01C 23/005 |
| 2019/0041233 A1* | 2/2019 | Duerksen | ............... | G01C 23/00 |
| 2020/0051441 A1* | 2/2020 | Ramachandra, Sr. | ...................... G01C 23/005 | |

\* cited by examiner

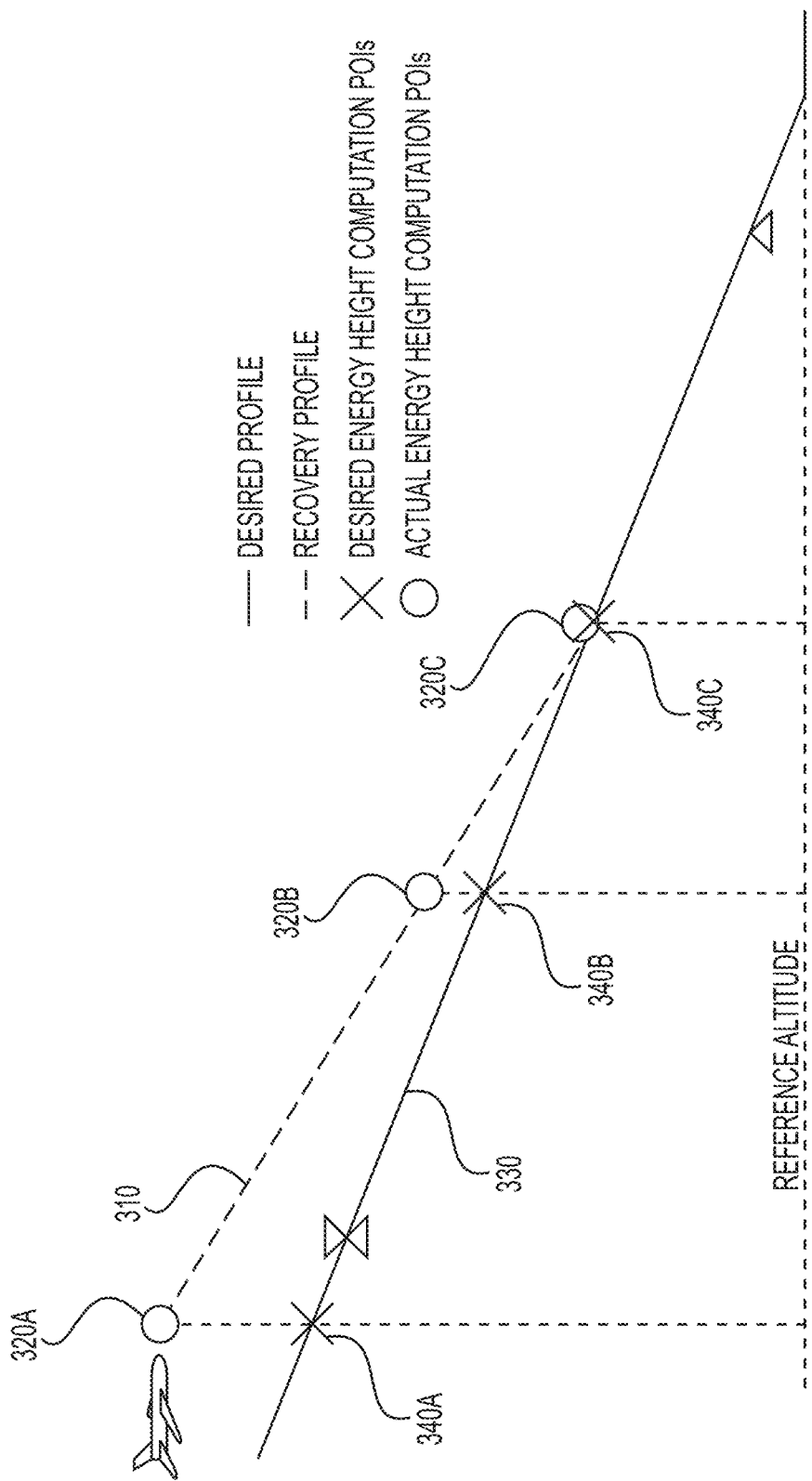

METHODS AND SYSTEMS FOR DEPICTING AN ENERGY STATE OF A VEHICLE

TECHNICAL FIELD

The present disclosure relates to methods and systems for displaying an energy state of a vehicle to a vehicle crew. More particularly, the present disclosure relates to methods and systems for monitoring actual and desired energy heights of an aircraft at various points of interest along a flight path.

BACKGROUND

Energy management of an aircraft is an important task during daily flight operations. The energy management may involve determining and monitoring an energy state of the aircraft during the course of the flight, in order to efficiently and/or safely maneuver the aircraft. The term energy state relates, at least in part, to the kinetic energy of the aircraft (i.e., forward motion through airspace) and the potential energy of the aircraft (i.e., in reference to the height of the aircraft above the ground). While proper execution of energy management can increase flight efficiency and reduce landing related incidents, it may also significantly increase crew workload if solely performed by the flight crew.

Current onboard systems provide information related to the energy state such as a vertical deviation, altitude and speed indications, an aircraft trajectory visualization to rejoin the descent and approach profile or to fly aircraft in lateral and/or vertical manual mode. However, there is currently no mechanism that allows a pilot to immediately understand a desired energy state versus an actual energy state and their rate of change at various points of interest. In particular, the current systems do not provide real-time energy state information in relation to an oncoming point of interest.

Therefore, there is a need for a system that is capable of dynamically providing energy state depiction at various points of interest, to achieve improved energy depiction, crew awareness, and flight safety. There is also a need for presenting the energy state information in a manner that is easy to interpret and understand, such that the crew can quickly evaluate the energy state with respect to a current situation as well as its progression and take any corrective measures.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

Further, while the background description and the following descriptions are provided in the context of an aircraft, it would be obvious to one of ordinary skill in the pertinent art that the same need may exist in other contexts, including but not limited to a vehicular travel involving motor vehicles (e.g., motorcycles, cars, trucks, buses, etc.), railed vehicles (e.g., trains, trams, subways, etc.), watercraft (e.g., ships, boats, yachts, etc.), spacecraft, and any other vehicles or moving machines. Therefore, the exemplary embodiments of the current disclosure may not be limited to aircraft, but may also be integrated with other machines, systems, components, or any other environment or context in which the aforementioned need may exist.

SUMMARY OF THE INVENTION

One embodiment provides a computer implemented method for depicting an energy state of a vehicle, comprising: receiving, by a flight management computer, a plurality of vehicle parameters associated with the vehicle; determining, by the flight management computer, a flight plan associated with the vehicle; identifying, by the flight management computer, a point of interest (POI) in the flight plan; determining, by the flight management computer, one or more trajectories associated with the flight plan; determining, by the flight management computer, an actual energy height (AEH) at the POI based on the one or more trajectories; determining, by the flight management computer, a desired energy height (DEH) at the POI based on the one or more trajectories; and displaying, by the flight management computer, the AEH and the DEH at the POI.

One embodiment provides a system for depicting an energy state of a vehicle. The system may comprise one or more processors; and a non-transitory computer readable medium storing instructions which, when executed by the one or more processors, cause the one or more processors to perform a method comprising: receiving, by a flight management computer, a plurality of vehicle parameters associated with the vehicle; determining, by the flight management computer, a flight plan associated with the vehicle; identifying, by the flight management computer, a point of interest (POI) in the flight plan; determining, by the flight management computer, one or more trajectories associated with the flight plan; determining, by the flight management computer, an actual energy height (AEH) at the POI based on the one or more trajectories; determining, by the flight management computer, a desired energy height (DEH) at the POI based on the one or more trajectories; and displaying, by the flight management computer, the AEH and the DEH at the POI.

One embodiment provides a non-transitory computer readable medium for depicting an energy state of a vehicle. The non-transitory computer readable medium may store instructions that, when executed by one or more processors, cause the one or more processors to perform a method comprising: receiving, by a flight management computer, a plurality of vehicle parameters associated with the vehicle; determining, by the flight management computer, a flight plan associated with the vehicle; identifying, by the flight management computer, a point of interest (POI) in the flight plan; determining, by the flight management computer, one or more trajectories associated with the flight plan; determining, by the flight management computer, an actual energy height (AEH) at the POI based on the one or more trajectories; determining, by the flight management computer, a desired energy height (DEH) at the POI based on the one or more trajectories; and displaying, by the flight management computer, the AEH and the DEH at the POI.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

Embodiments of the invention will now be described, by way of example only, with reference to the accompanying drawings in which:

FIG. 3 depicts an exemplary descent and approach profile of an aircraft.

FIG. 9B is a flowchart illustrating another exemplary method of depicting an energy ratio of a vehicle, according to one aspect of the current disclosure.

DETAILED DESCRIPTION

Figure 1:
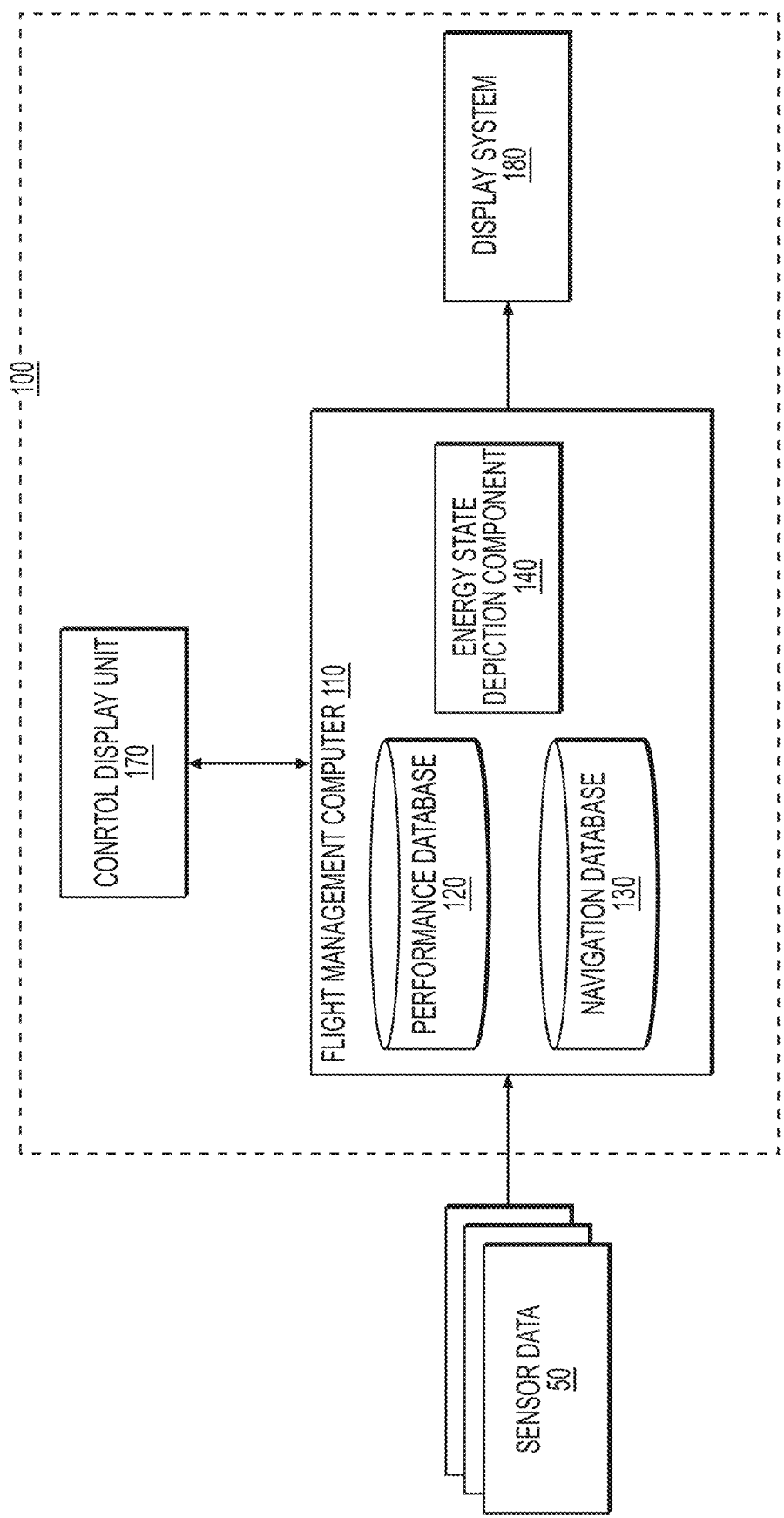
FIG. 1 shows an exemplary embodiment of a flight management system, according to one aspect of the current disclosure.

The following embodiments describe systems and methods for displaying an energy state of a vehicle to a vehicle crew. More particularly, the present disclosure relates to methods and systems for monitoring actual and desired energy heights of an aircraft at various points of interest along a flight plan or intended path In general, the disclosed embodiments are directed to depicting a current and/or a future energy state of a vehicle. A plurality of vehicle parameters associated with the vehicle may be received, and a flight plan or intended path associated with the vehicle may be determined. From the flight plan or intended path, a point of interest may be identified. The point of interest may be a current location of the aircraft, or an oncoming point of interest identified from the flight plan or intended path. Then, an actual energy height and a desired energy height of the aircraft at the point of interest may be determined. The determined actual energy height and desired energy height may be displayed using display elements in a user-friendly manner, such that the user viewing the energy state information may be able to quickly interpret the energy state information and take remedial measures for a safe and efficient flight.

The disclosed systems and methods provide an improvement to the current aircraft or flight systems, either onboard or off-board, by providing a mechanism capable of presenting aircraft energy state and the rate of change information dynamically and in a manner that is easy to understand. Further, the disclosed systems and methods enable computation of current aircraft energy state as well as prediction of aircraft energy state at a downpath (i.e., oncoming) point of interest. By utilizing the disclosed techniques, a vehicle operator may be provided with a "forward field of view" (FFV) of energy state information to help operate the vehicle in a more efficient and safe manner (e.g., save fuel and avoid hard landing), and a significant amount of crew and system workload (e.g., use of excess thrust reversal or airbrakes after touch down) may be reduced during energy management scenarios.

Subject matter will now be described more fully hereinafter with reference to the accompanying drawings, which illustrate specific exemplary embodiments. An embodiment or implementation described herein as "exemplary" is not to be construed as preferred or advantageous, for example, over other embodiments or implementations; rather, it is intended to reflect or indicate that the embodiment(s) is/are "example" embodiment(s). Subject matter may be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part.

Referring now to the appended drawings, FIG. 1 shows an exemplary embodiment of a flight management system, according to one aspect of the current disclosure. In general, the flight management system (FMS) 100 may include, at least in part, a flight management computer (FMC) 110, a control display unit (CDU) 170, and a display system 180. The FMC 110 may comprise, at least in part, a performance database 120, a navigation database 130, and an energy state depiction component 140. The FMC 110 may be a specialized, embedded onboard computer system similar to or consistent with the computing system depicted in FIG. 10, and configured to automate various navigation and aircraft performance-related tasks, including but not limited to data calculations, data aggregation, data comparison, data storage, data transmission, data query and retrieval and data display.

The FMC 110 may calculate a course for the aircraft to follow based on a flight plan (or intended path) and a position of the aircraft. More particularly, the FMC 110 may perform optimal performance computation, navigation and position determination, air data and navigation sensor management, flight planning, guidance and steering (both lateral and vertical), etc. For instance, the energy state depiction component 140 of the FMC 110 may dynamically determine the energy states (e.g., actual and desired energy heights) of the aircraft at one or more points of interest along the planned route. To perform the aforementioned tasks, the FMC 110 may collect sensor data 50 from various sensors installed on the aircraft, and may also receive navigation and performance-related data from external systems via wired and/or wireless connection. The received data may be stored in one or more databases of the FMC 110, such as the performance database 120 and the navigation database 130, depending on the data type. For example, aerodynamic and engine performance models of the airplane (e.g., maximum take-off weight, fuel weight, center of gravity, altitudes, etc.) may be stored in the performance database 120. The information stored in the performance database 120 may be used to predict performance characteristics that govern the optimal vertical profile of the aircraft. The navigation database 130 may store information related to navigation or routing of the aircraft in a geographic area. In particular, the navigation database 130 may contain data elements from which a flight plan (or intended path) is constructed. The information stored in the navigation database 130 may include, for example, waypoints, airports, runways, airways, radio navigation aids, holding patterns, etc.

The CDU 170 may include a display and a keyboard that allow a user to interface with the FMC 110. For example, the CDU 170 may display airplane initialization, reference, flight planning, and performance data. The keyboard of the CDU 170 may enable the user to enter parameter values to support processing of flight management functions. For example, the user may key in input route information via the CDU 170. The display system 180 may receive data from the FMC 110 (e.g., airspeed, altitude, heading, attitude, vertical speed, energy state, flight plan or intended path, navigation and map information, weather information, data about aircraft performance and systems, etc.) and display the received data via one or more displays. Specifically, the display system 180 may receive information pertaining to the energy state of the aircraft and display the energy state of the aircraft in a manner that is easy to understand, in order to enable flight crew to take appropriate measures upon viewing the energy state information. The display system 180 may be, for example, an electronic flight instrument system (EFIS).

Figure 2:
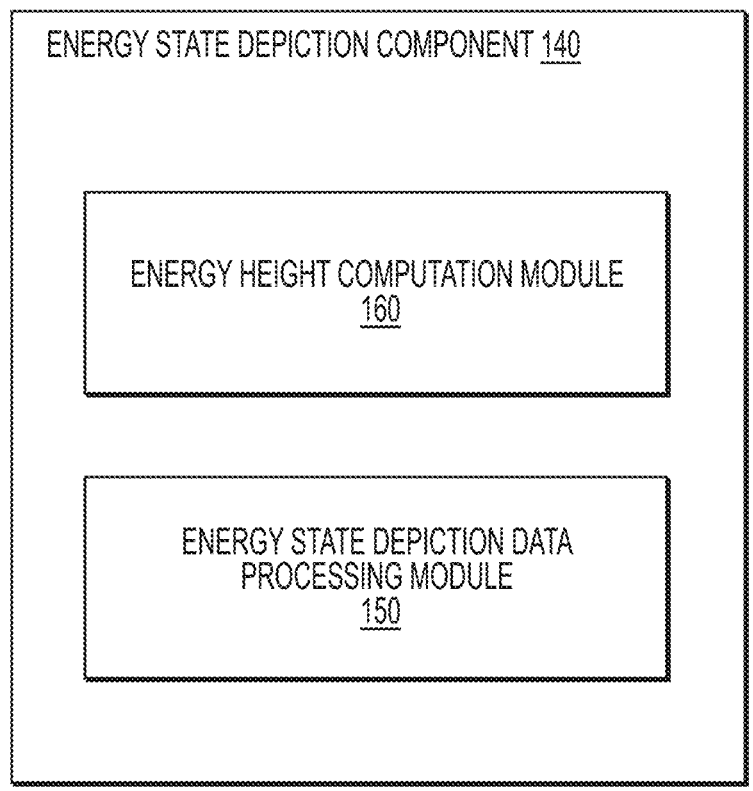
FIG. 2 shows an exemplary embodiment of an energy state depiction component, according to one aspect of the current disclosure.

FIG. 2 shows an exemplary embodiment of an energy state depiction component 140, according to one aspect of the current disclosure. In general, the energy state depiction component 140 may comprise an energy height computation module 160 and an energy state depiction data processing module 150. As will be described in greater detail below, the energy height computation module 160 may determine an actual energy height (AEH) and a desired energy height (DEH) at a point of interest (POI) identified along a planned route of the aircraft. The AEH and DEH may be determined based on one or more trajectories associated with the flight plan (or intended path) of the aircraft. The one or more trajectories may comprise a lateral trajectory and/or a vertical trajectory. In one embodiment, the AEH and DEH may be determined based on the vertical trajectory. The vertical trajectory may be determined by the FMC 110 and may comprise projected speed and altitude information of the aircraft for the entire course or a portion of the flight. In some embodiments, the AEH and DEH may be determined based on one or more of the lateral trajectory and the vertical trajectory. The energy height computation module 160 may also determine an energy ratio based on the determined AEH and DEH. In one embodiment, the energy ratio may be a ratio of the AEH at the POI to the DEH at the POI (i.e., energy ratio=AEH/DEH). The energy ratio may thus represent the change in the AEH with respect to the DEH.

With continuing reference to FIG. 2, the energy state depiction data processing module 150 may receive the determined energy state information (i.e., the AEH and DEH at a POI) and generate display elements illustrative of the determined energy state information. For example, the energy state depiction data processing module 150 may generate display elements that are sent to the display system 180 and enable the display system 180 to show a bar indicator representative of a degree of the AEH and another bar indicator representative of a degree of the DEH. The energy state depiction data processing module 150 may also configure the arrangement of the display elements. For example, the energy state depiction data processing module 150 may configure the bar indicators to be displayed side-by-side (i.e., adjacent to each other) such that the viewer may be able to quickly tell whether the AEH at the POI is higher or lower than the DEH at the POI. The display elements of the current disclosure, that enable users to quickly and easily interpret the displayed energy state information, will be described in greater detail below.

FIG. 3 depicts an exemplary descent and approach profile of an aircraft, for the purposes of better explaining certain aspects of the disclosed embodiments. Following an adequate descent and approach profile is a critical step in landing the aircraft safely and efficiently, as descending too early may result in flying too long at low level which may reduce terrain clearance and waste fuel, and descending late may result in unnecessary turns and high rates of descent, which may lead to an unstable approach and landing. A correct management of aircraft energy state during the descent and approach phase of the flight may be necessary in order to follow the desired descent and approach profile. In FIG. 3, line 330 represents a desired descent and approach profile (i.e., desired profile) and line 310 represents an actual flight path of the aircraft (i.e., recovery profile). The actual flight path may be projected (i.e., predicted) by the FMC 110 based on the current environmental and performance data associated with the aircraft. When the actual flight path of the aircraft deviates from the desired descent and approach profile, the pilot may need to manage the energy state of the aircraft to recover the desired flight path. In order to aid the pilot in managing the energy state of the aircraft, the energy state depiction component 140 of the FMC 110 may determine the AEH and DEH at one or more points of interest (POIs) during the descent and approach phase of the flight. The AEH and DEH at a POI may be determined using the equation below (i.e., total energy equation):

$$EH = H + (1/(2g)) * V^2$$

where H is the height of the aircraft from the ground (i.e., altitude),
g is an acceleration due to gravity, and
V is the velocity of the aircraft.

As depicted in FIG. 3, the energy state depiction component 140 may determine the AEH and DEH at various POIs, which may be user-selected. The POIs may comprise the current location of the aircraft and any future location of the aircraft over the course of the flight based on the flight plan (or intended path). Each POI may be expressed in terms of a desired POI and an actual POI. A desired POI may refer to a POI identified along a desired flight path (i.e., along a desired profile), from which a desired energy height may be calculated. For example, in FIG. 3, points 340A, 340B, and 340C are the desired POIs. An actual POI may refer to an actual location of the aircraft along a projected actual flight path (i.e., along a recovery profile) that corresponds to the desired POI. An actual energy height may be calculated based on the actual POI. For example, in FIG. 3, points 320A, 320B, and 320C are the actual POIs.

In FIG. 3, point 320A is an actual POI that represents the current location of the aircraft, and point 340A is a desired POI that represents the desired location of the aircraft at the current moment. The AEH and DEH may be determined based on the altitude and velocity of the aircraft at points 320A and 340A, respectively. More specifically, the altitude and velocity of the aircraft at point 320A may represent the current altitude and velocity of the aircraft (which may be used to determine the actual energy height), and the altitude and velocity at point 340A may represent the desired altitude and velocity of the aircraft at the current moment (which may be used to determine the desired energy height). Using these values, the energy state depiction component 140 may calculate the AEH and DEH. The display system 180 may then present the AEH and DEH using display elements for easy interpretation. By viewing the energy state information, the pilot may be able to determine how much and in which direction the aircraft currently deviates from the desired profile, and take remedial actions to bring the energy state of the aircraft closer to the desired level (e.g., adjust altitude, speed, etc.).

With continuing reference to FIG. 3, the energy state depiction component 140 may also determine the DEH and AEH at one or more oncoming POIs. For example, point 340B is a desired POI that represents a desired location of the aircraft at a user-selected, oncoming POI. Point 320B is an actual POI that represents a predicted, actual location of the aircraft at the user-selected POI. The DEH and AEH may be determined based on the altitude and velocity of the aircraft at points 340B and 320B, respectively. More specifically, the altitude and velocity of the aircraft at point 340B may represent the desired altitude and velocity of the aircraft at the selected POI, and the altitude and velocity of the aircraft at point 320B may represent the predicted actual altitude and velocity of the aircraft at the selected POI. Using these values, the energy state depiction component 140 may calculate the AEH and DEH values for the selected POI. The display system 180 may then present the AEH and DEH using display elements. The DEH and AEH at other POIs (e.g., points 340C and 320C) may also be determined and presented in the manner described above.

Figure 4A:
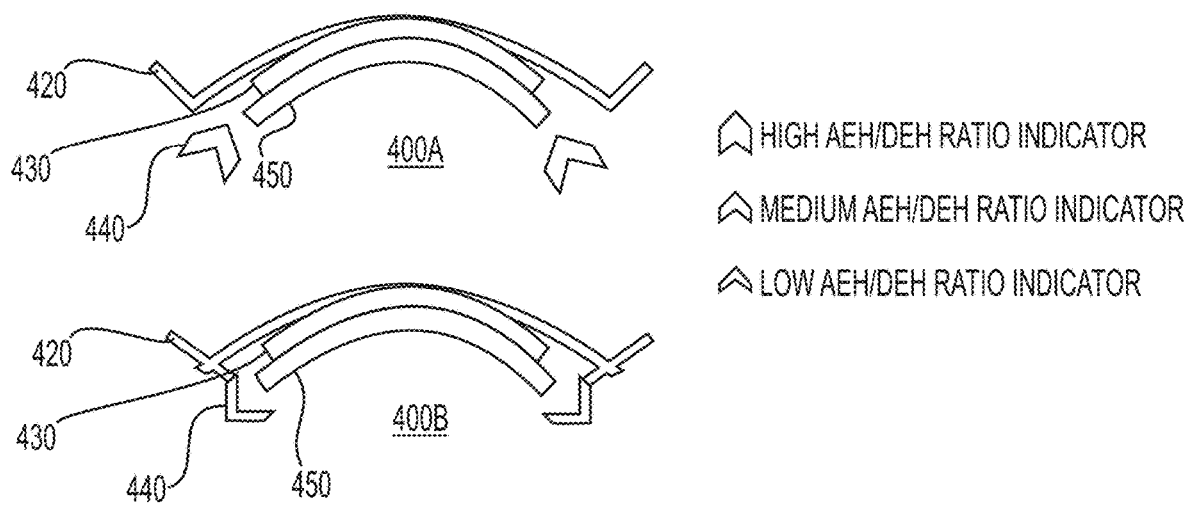
FIG. 4A shows an exemplary embodiment of various display elements for depicting an energy state of a vehicle, according to one aspect of the current disclosure.

FIG. 4A shows an exemplary embodiment of various display elements for depicting energy states of a vehicle, according to one aspect of the current disclosure. The AEH and DEH of an aircraft at a POI may be displayed together in the form of a scale. For example, in FIG. 4A, such a scale may comprise display elements 420, 430, 440, and 450. More specifically, the scale may comprise an energy range bar 420, a DEH bar indicator 430, an AEH bar indicator 450, and an energy ratio indicator 440. The length of the DEH bar indicator 430 may represent the degree of DEH at the POI, and the length of the AEH bar indicator 450 may represent the degree of AEH at the POI. In FIG. 4A, the DEH and AEH bar indicators 430 and 450 are curved. However, the DEH and AEH bar indicators 430 and 450 may also be straight. Each of the DEH and AEH bar indicators 430 and 450 may be color-coded to be distinguishable from the other. Displaying the DEH bar indicator 430 and AEH bar indicator 450 side-by-side or adjacent to each other allows the user to easily compare the DEH and AEH relative to each other. Further, the energy ratio indicator 440 may indicate, based on the thickness of the indicator, whether the ratio of the AEH to the DEH (i.e., energy ratio and/or the rate at which the AEH is changing with respect to the DEH) is high, medium, or low. The energy ratio indicator 440 may be arrow-shaped (or shaped in a way that it points to a certain direction), and may further indicate whether the AEH is decreasing or increasing based on the direction to which the energy ratio indicator 440 is pointing. For example, in scale 400A, the energy ratio indicator 440 indicates that the energy ratio is medium (i.e., the rate at which the AEH is changing with respect to the DEH is moderate), and that the AEH is decreasing. In scale 400B, the energy ratio indicator 440 indicates that the energy ratio is low, and that the AEH is increasing.

Figure 4B:
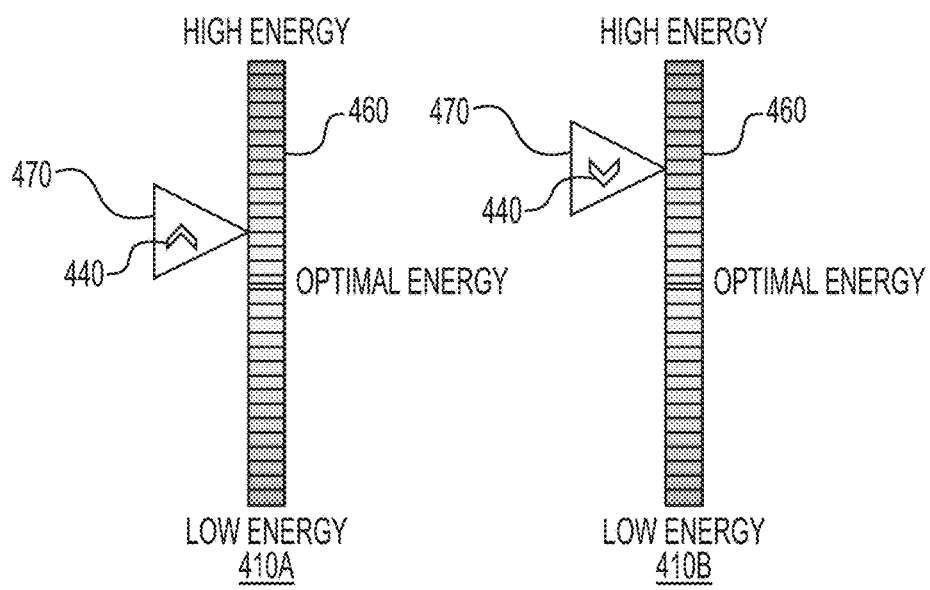
FIG. 4B shows another exemplary embodiment of various display elements for depicting an energy state of a vehicle, according to one aspect of the current disclosure.

FIG. 4B shows another exemplary embodiment of various display elements for depicting energy states of a vehicle, according to one aspect of the current disclosure. In this additional or alternative embodiment, the AEH and DEH of an aircraft at a POI may similarly be represented in a scale, but the scale may take more of a gauge-like configuration. For example, in FIG. 4B, a scale may comprise an energy range bar 460, an AEH indicator 470, and an energy ratio indicator 440. The DEH, which may also be referred to as optimal energy, may correspond to the midway point of the energy range bar 460 as illustrated in FIG. 4B. Then, the AEH at the POI may be indicated by positioning the AEH indicator 470 adjacent the energy range bar 460. For instance, as shown in FIG. 4B, if the AEH is higher than the DEH, the AEH indicator 470 may be placed next to the energy range bar 460 such that the AEH indicator 470 points to a section along the energy range bar 460 higher than the optimal energy level (e.g., higher than the midway point). Conversely, if the AEH is lower than the DEH, the AEH indicator 470 may be placed next to the energy range bar 460 such that the AEH indicator 470 points to a section along the energy range bar 460 lower than the optimal energy level. If the AEH is the same as the DEH, the AEH indicator 470 may be placed such that the indicator point to or aligns with the optimal energy level. In one embodiment, the energy ratio indicator 440 may be placed within the AEH indicator 470. As discussed above, the energy ratio indicator 440 may indicate, based on the thickness of the indicator, whether the ratio of the AEH to the DEH (i.e., energy ratio and/or the rate at which the AEH is changing with respect to the DEH) is high, medium, or low. Furthermore, the energy ratio indicator 440 may indicate whether the AEH is decreasing or increasing based on the direction to which the energy ratio indicator 440 is pointing. For example, in scale 410A, the energy ratio indicator 440 indicates that the energy ratio is low (i.e., the rate at which the AEH is changing with respect the DEH is low), and that the AEH is increasing. In scale 410B, the energy ratio indicator indicates that the energy ratio is medium (i.e., the rate at which the AEH is changing with respect to the DEH is moderate), and that the AEH is decreasing. It should be noted that the shapes and the arrangements of the display elements may not be limited to those explicitly shown in FIGS. 4A-4B. For example, the energy range bar 460 may instead be annular-shaped (i.e., disc-shaped with a hollow center), with the AEH indicator 460 positioned in the center and configured to point to an appropriate section of the energy range bar 460 by rotating around the center axis.

In some embodiments, the energy range bars discussed above in FIG. 4A and FIG. 4B may be presented based on the altitude component (i.e., potential energy component) and/or the velocity component (i.e., kinetic energy component) of the total energy equation (EH) discussed above. For example, the energy range bars may be presented graphically by a low-to-high velocity (or airspeed) range, actual velocity and/or the optimal velocity symbology. The scale for the potential energy component (i.e., altitude) of the total energy may also be presented similarly. In some embodiments, a user can select a POI on the flight plan (e.g., a waypoint) on a Navigation Display (ND) or Vertical Situation Display (VSD), and the differences between the actual and desired speed and/or altitudes at that POI may be numerically and/or graphically presented. Similar information could also be presented on the FMS Legs Page. In addition, the POI symbol (e.g., waypoint) may be visually coded (e.g. size, shape, color, density of dot fill, etc.) to convey the extent of the difference between the AEH and DEH at a given POI on the ND or VSD.

Figure 5:
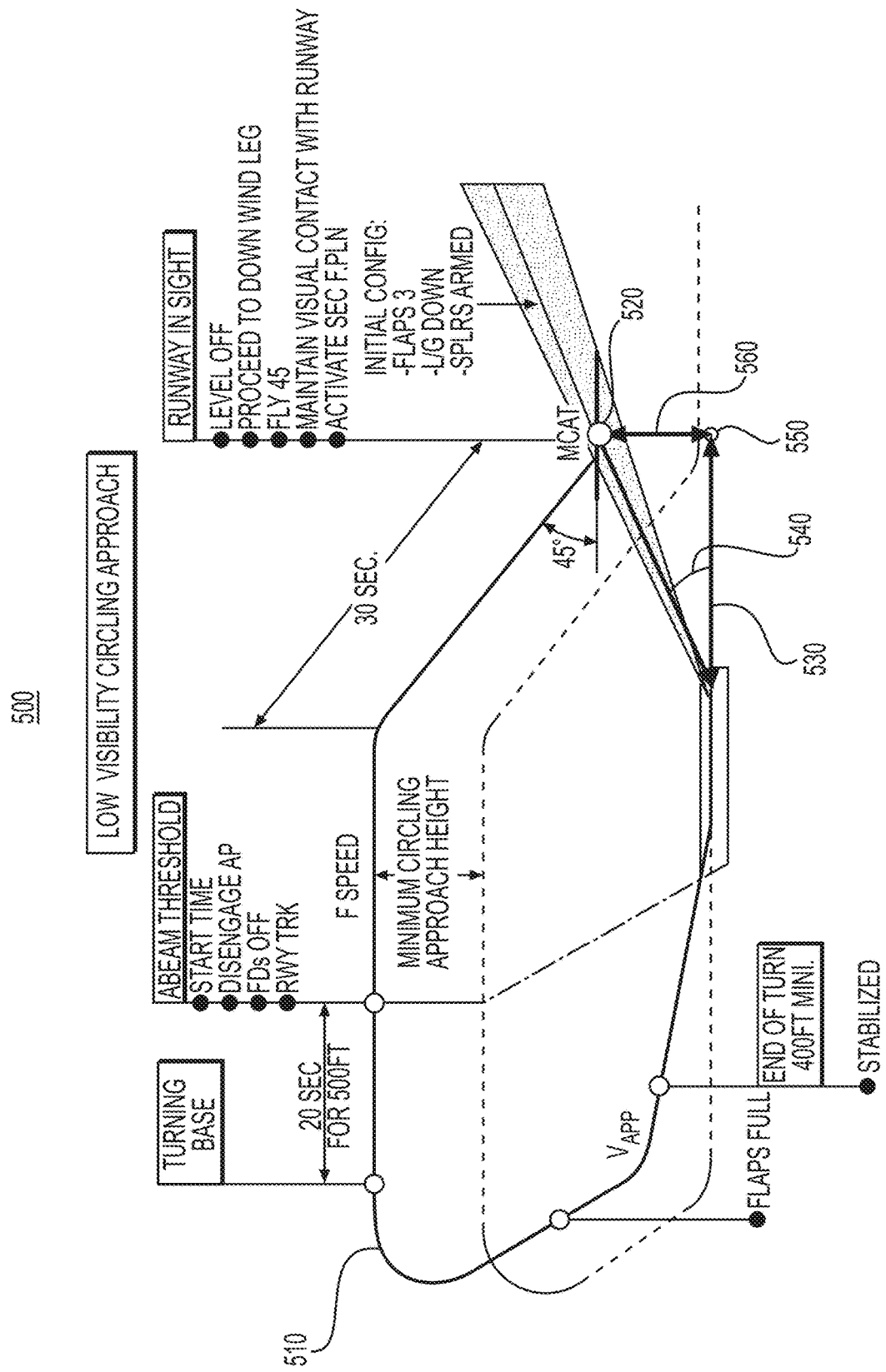
FIG. 5 illustrates an exemplary use case scenario in which the disclosed embodiments may be used, according to one aspect of the current disclosure.

FIG. 5 illustrates an exemplary use case scenario in which the disclosed embodiments may be used, according to one aspect of the current disclosure. In particular, FIG. 5 depicts a standard circle-to-land configuration 500 including a circling path 510. Pilots may fly circling approaches when it may not be possible to do a straight-in approach to the runway after an instrument approach. Circling approaches may be necessitated by a variety of reasons, such as strong tailwinds, obstacles, high descent angles, etc. In a circle-to-land scenario, pilots may need to use sound judgment and have an in-depth knowledge of the aircraft capabilities and performance, in order to determine the exact circling maneuver to perform under a given context, which may be defined by various factors such as the weather condition, airport design, runway condition and length, etc. In the case of a non-standard landing configuration and/or an aircraft approaching at high speeds (i.e., higher-than-desired speed), circling minima associated with a higher approach category may need to be used. For example, the circling area may need to be expanded in order to provide more time for the aircraft to decelerate to the final approach speed (i.e., $V_{APP}$). These situations can be circumvented or alleviated by monitoring and managing the energy state of the aircraft ahead of time (i.e., maintain an energy state that does not deviate considerably from the desired energy state), such that the aircraft may be flown in a standard or planned configuration.

For example, prior to the aircraft arriving at the minimum circling approach threshold (MCAT) 520 where the "circling" maneuver is to be initiated, the DEH and AEH at the MCAT 520 (i.e., a POI) and/or any prior POIs may be determined and presented, enabling the pilot to recognize any deviation from the desired energy state and recover the desired energy state by taking certain actions. The DEH at the MCAT 520 ($DEH_{mcat}$ or $DEH_{POI}$) may be calculated based on the following equation:

$$DEH_{mcat} = H_{mcat} + (1/(2g))*V_{mcat}^2$$

where $H_{mcat}$ (or $H_{POI}$) is the minimum circling approach height 560, which is the height (altitude) of the aircraft at MCAT 520, g is an acceleration due to gravity, and $V_{mcat}$ (or $V_{POI}$) is the desired velocity of the aircraft at MCAT 520.

The minimum circling approach height 560 ($H_{mcat}$ or $H_{POI}$) considered in the DEH computation may be determined using the following equation:

$$H_{mcat} = TE + \tan(FPA)*D$$

where TE is the threshold elevation,

FPA is the flight path angle 540, and

D is the distance 530 between the touchdown point and the threshold elevation point 550.

Lastly, the AEH at MCAT 520 ($AEH_{mcat}$ or $AEH_{POI}$) may be calculated based on the following equation:

$$AEH_{mcat} = Hp_{mcat}(1/(2g))*Vp_{mcat}^2$$

where $Hp_{mcat}$ (or $Hp_{POI}$) is the predicted height (altitude) of the aircraft at the predicted actual POI, g is an acceleration due to gravity, and $Vp_{mcat}$ (or $Vp_{POI}$) is the predicted velocity of the aircraft at the predicted actual POI.

Figure 6A:
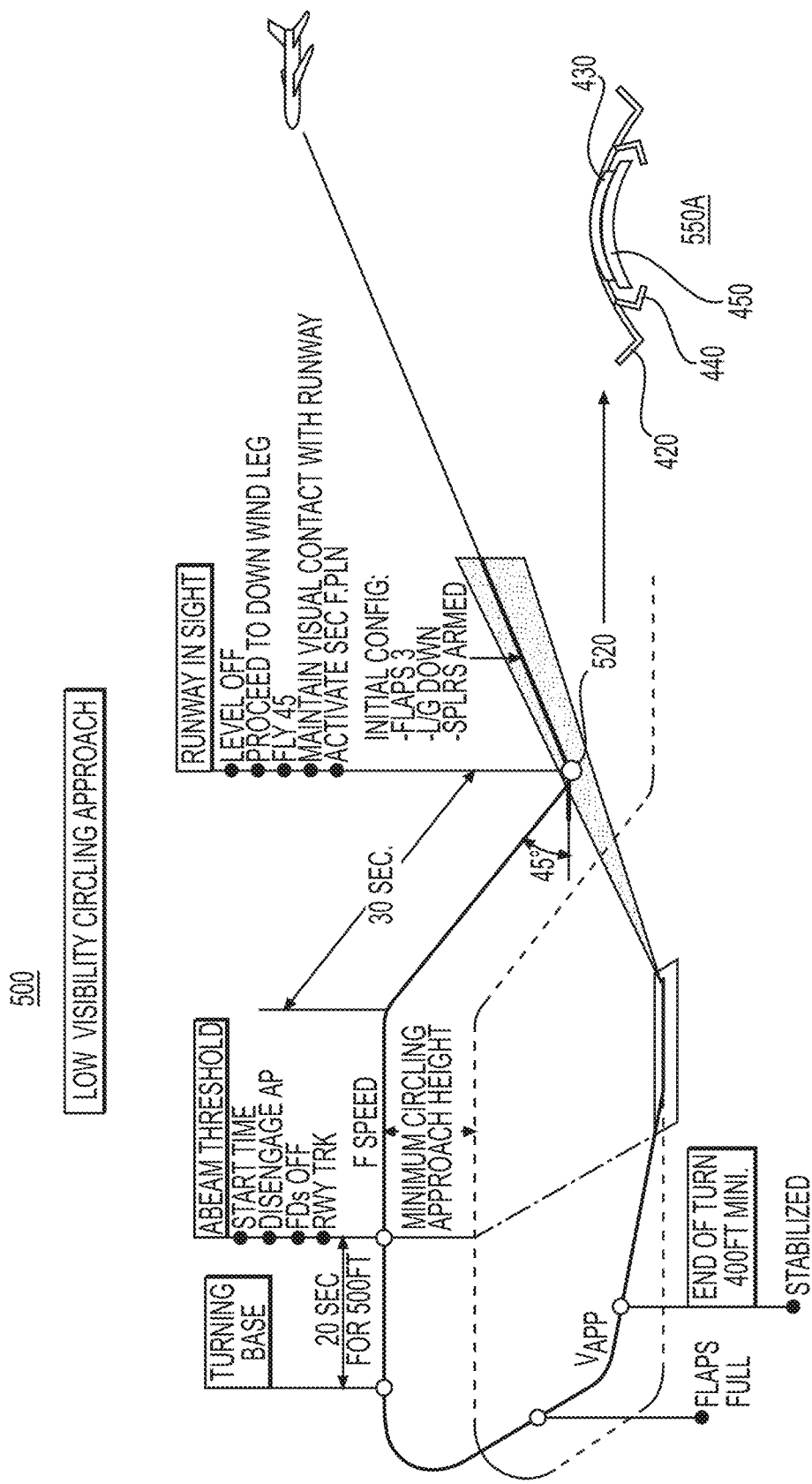
FIGS. 6A-6C show display elements presented under varying contexts in anticipation of a circling approach, according to one aspect of the current disclosure.
Figure 6B:
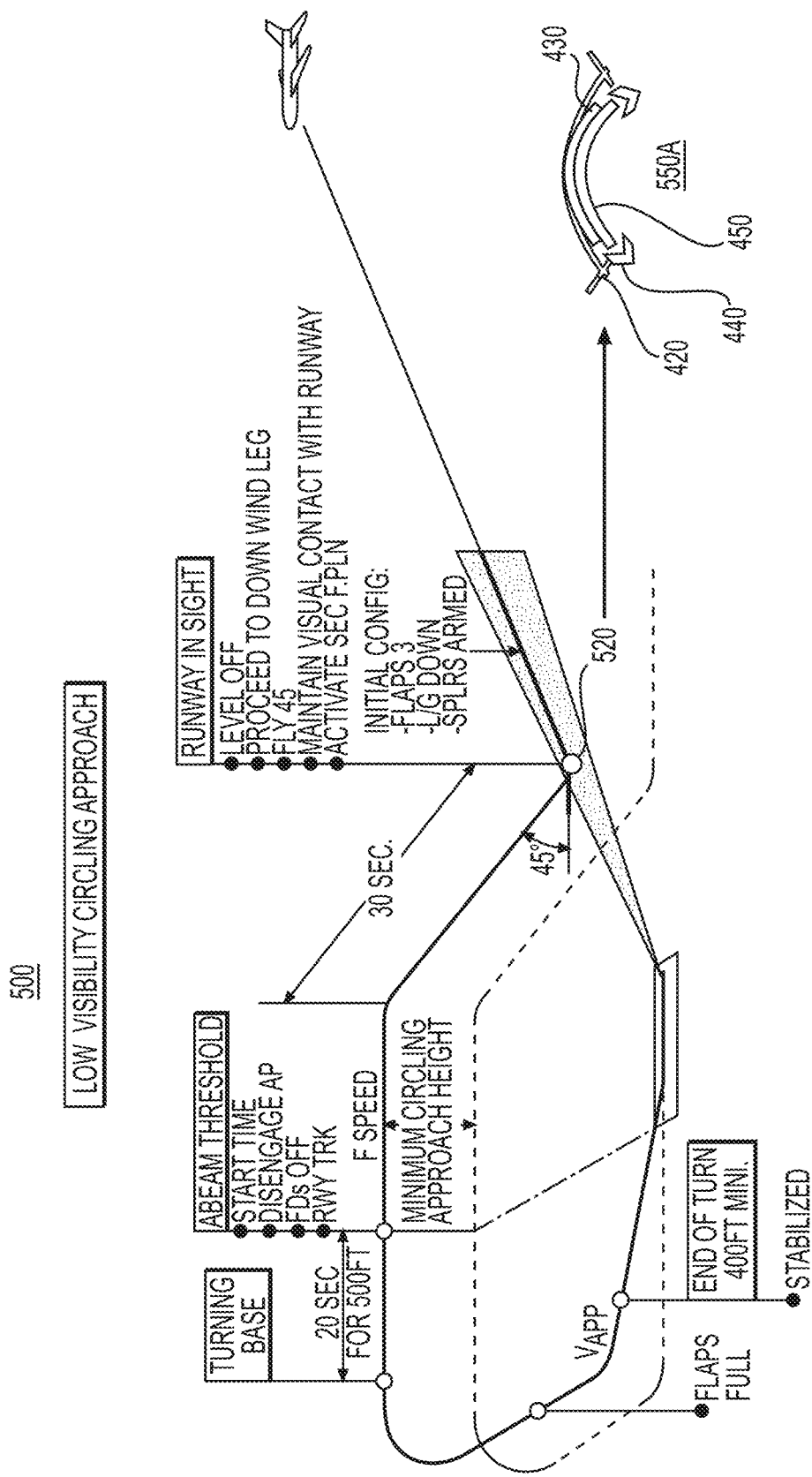
Figure 6C:
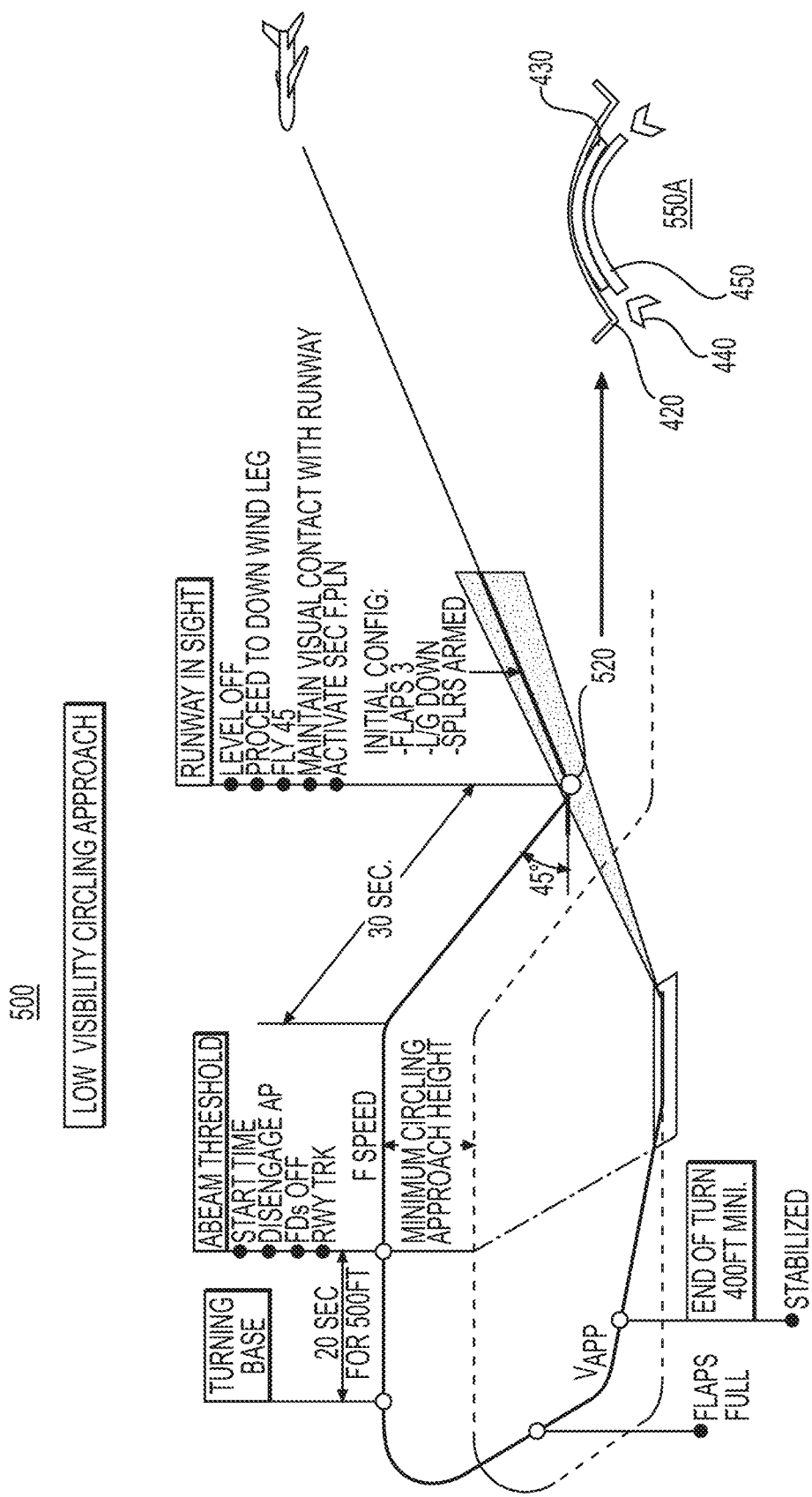

Once the DEH and AEH at the selected POI, MCAT 520, have been determined, the DEH and AEH are displayed via the display system 180 using the display elements described above with reference to FIGS. 4A-4B and/or the embodiments discussed above with regards to the ND or VSD. For example, FIGS. 6A-6C show the display elements presented under varying contexts in anticipation of a circling approach, according to one aspect of the current disclosure. In FIGS. 6A-6C, the pilot has selected the MCAT 520 as the POI for which a DEH and AEH are calculated, and the calculated DEH and AEH are presented to the pilot using the scale 550A. In FIG. 6A, scale 550A shows that the AEH is higher than the DEH at the POI with a low energy ratio (i.e., the AEH is slightly higher than the DEH, and/or the rate at which the AEH is changing with respect to the DEH is low), and that the AEH is increasing. The AEH being higher than the DEH is indicated by the AEH bar indicator 450 being longer than the DEH bar indicator 430, and the low energy ratio is indicated by the thickness of the energy ratio indicator 440 being relatively small. Further, the energy ratio indicators 440 are pointing outward from the AEH bar indicator 450, indicating that the AEH is increasing. In FIG. 6B, which may illustrate a stage that has further progressed from the stage illustrated in FIG. 6A, scale 550A shows that the AEH is further increasing. For instance, the scale 550A in FIG. 6B shows that the AEH is still higher than the DEH at the POI but now with a medium energy ratio (i.e., the AEH has become moderately higher than the DEH, and/or the rate at which the AEH is changing with respect to the DEH is moderate). The AEH becoming even higher compared to the AEH in FIG. 6A may be indicated by the AEH bar indicator 450 becoming longer, and/or by the energy ratio indicator 440 becoming thicker than those in FIG. 6A. In instances where a symbol such as a waypoint is used to represent the POI, as alluded to above, the waypoint may be visually coded to represent the same information (e.g., bloom in size, change in color, etc.) to represent the higher energy state, or numerical information that is color coded (e.g., amber colored airspeed and/or altitude at the POI) may also be presented.

Upon following the progression of the energy state represented by the scale 550A in FIGS. 6A-6B, the pilot may realize that the aircraft is flying too fast or too high, and may take actions to slow down and/or bring the aircraft down to a lower altitude, bringing the actual energy height of the aircraft closer to the desired energy height. For example, in FIG. 6C, the pilot reacts to the increasing AEH (or the AEH that is higher than the DEH) by taking remedial measures described above. Accordingly, scale 550A shows the energy ratio indicators 440 pointing inward toward the AEH bar indicator 450, indicating that the AEH is starting to decrease. Similar display elements could be presented in instances where the POI is represented by a waypoint symbol (e.g., arrows adjacent to the waypoint). The pilot may continue to decrease the speed and/or descend until the thickness of the energy ratio indicators 440 become very small and/or the length of the AEH bar indicator 450 becomes approximately the same as the length of the DEH bar indicator 430. Once the pilot has brought the energy height of the aircraft to the desired energy height, the pilot may safely perform a circling maneuver in accordance with the standard or planned configuration.

Figure 7:
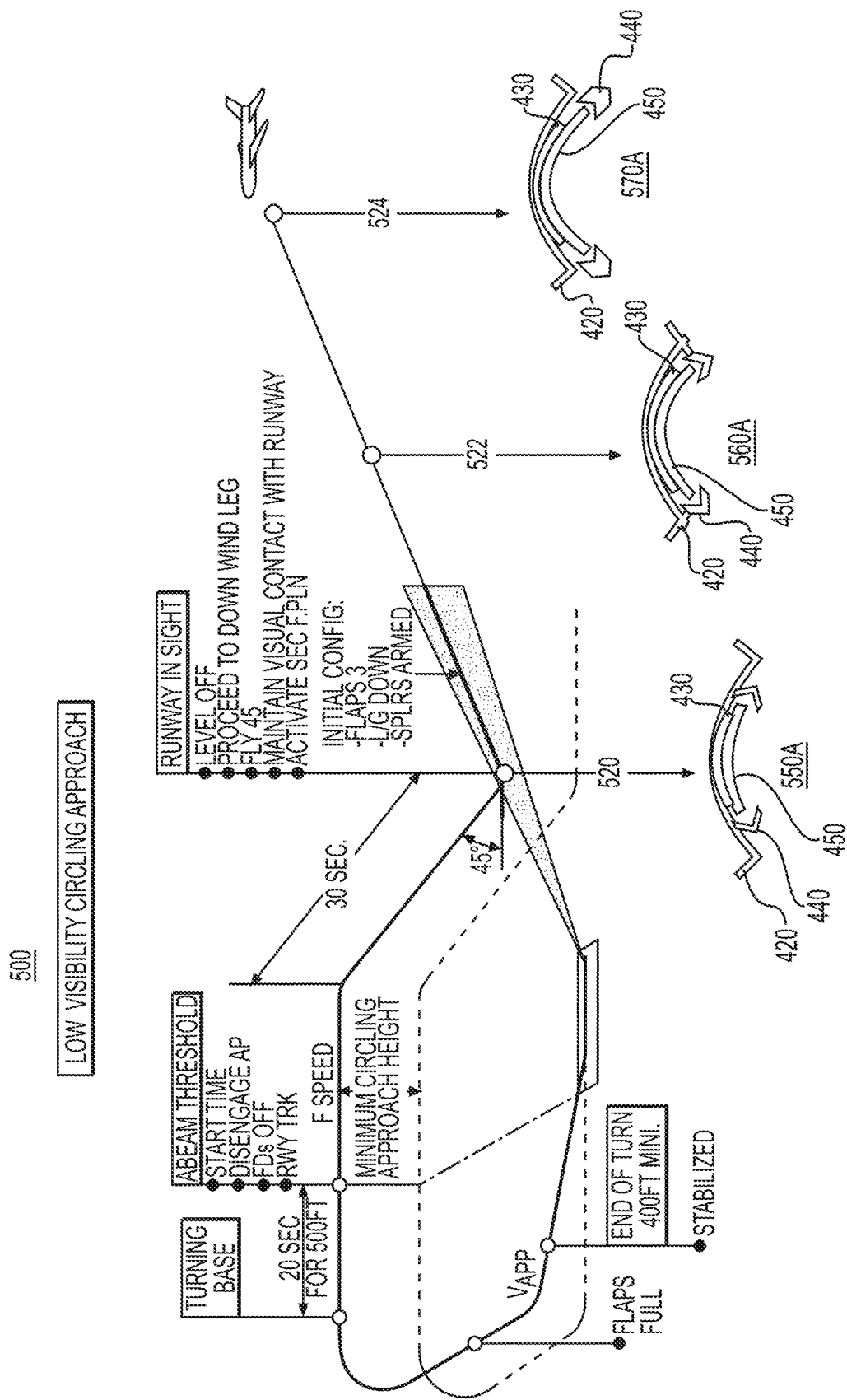
FIG. 7 shows multiple sets of display elements, each set of display elements depicting energy state information associated with a POI among a plurality of POIs, according to one aspect of the current disclosure.

In an alternative or additional embodiment, the energy state information may be iteratively determined and displayed for multiple POIs. In other words, the energy state information associated with a nearest POI along the planned route may first be determined and displayed, and once the aircraft has arrived at that POI, the energy state information associated with a subsequent nearest POI along the planned route may be determined and displayed. This process is repeated until the aircraft has reached all POIs along the planned route. For instance, FIG. 7 shows multiple sets of display elements, each set of display elements depicting energy state information associated with a POI among a plurality of POIs, according to one aspect of the current disclosure. In the context of FIG. 7, there may be three POIs in the remaining route, namely a first POI 524, a second POI 522, and a third POI 520 (i.e., MCAT 520). In some embodiments, the first POI 524 may correspond to the current location of the aircraft. A scale depicting energy state information may be generated and displayed for each oncoming POI. For example, scale 570A depicting the energy state information associated with the first POI 524 may be presented before the aircraft arrives at the first POI 524. Scale 560A depicting the energy state information associated with the second POI 522 may be presented after the aircraft has passed the first POI 524. Scale 550A depicting the energy state information associated with the third POI 520 may be presented after the aircraft has passed the second POI 524. Therefore, scales 570A, 560A, and 550A may be presented in sequence (i.e., one appearing after another) depending on the location of the aircraft relative to the POIs. Alternatively, scales associated with all of the oncoming POIs may be displayed simultaneously, and as the aircraft passes each one of those POIs, the scale associated with the passed POI may be removed from display. In yet another embodiment, the POIs may be represented by a series of waypoints that are visually coded on the basis of the AEH and DEH, and/or their respective components such as speed and altitude at each POI.

As another example, the disclosed embodiments may also be used in a radar vector scenario, where an unanticipated change may be made to the flight plan or intended path (e.g., by the air traffic controller) and the pilot may need to adjust the energy state to conform to the new desired energy state in accordance with the changed flight plan or intended path. It should be noted that the disclosed embodiments may be applicable to any context in which an efficient management of a vehicle energy state may be desired. Application of the disclosed embodiments thus may not be limited to the use case scenarios specifically discussed herein, such as the circle-to-land scenario discussed in regards to FIGS. 5 and 6A-6C or the radar vector scenario.

Figure 8:
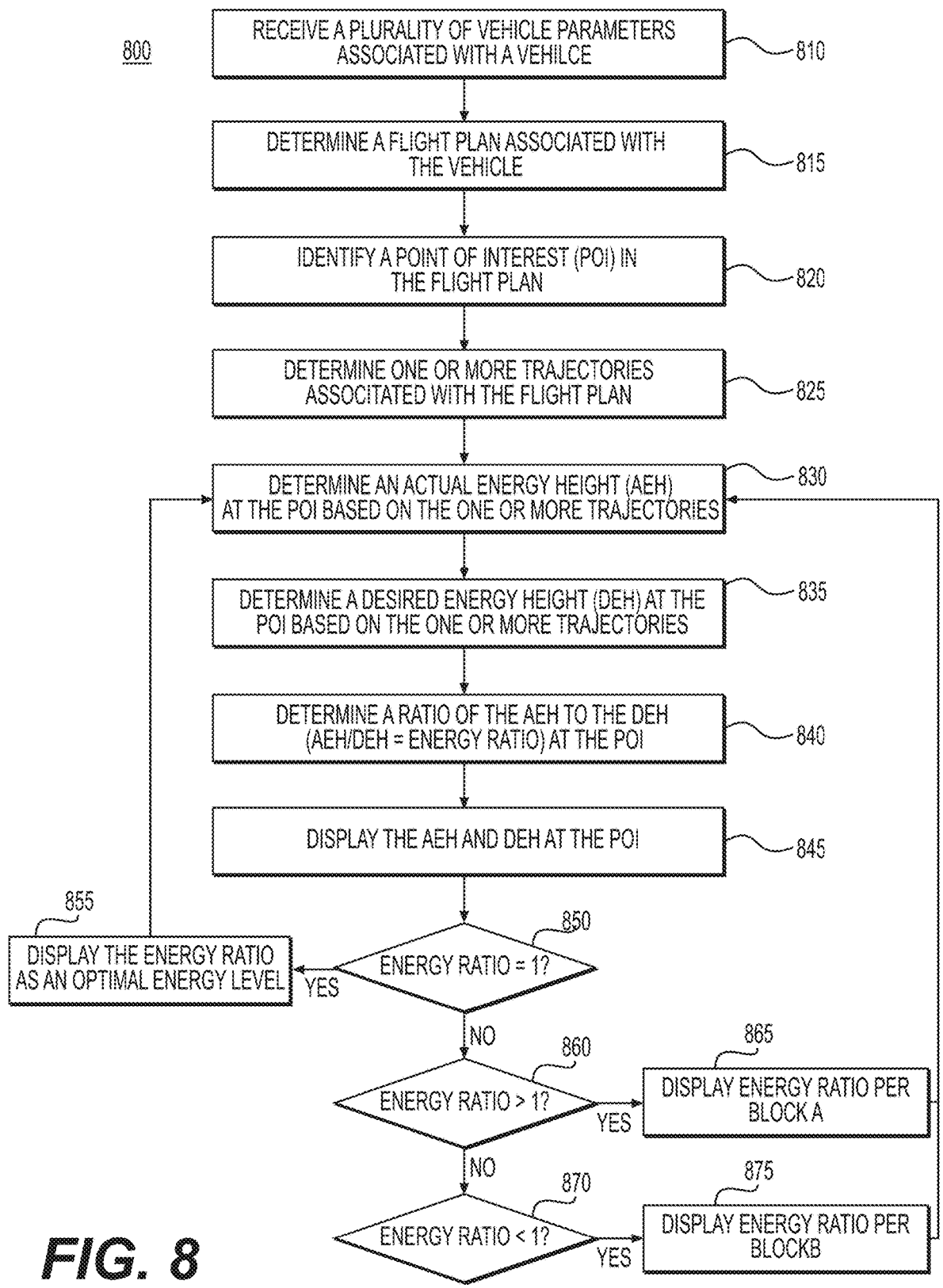
FIG. 8 is a flowchart illustrating an exemplary method of depicting an energy state of a vehicle, according to one aspect of the current disclosure.

FIG. 8 is a flowchart illustrating an exemplary method of depicting an energy state of a vehicle, according to one aspect of the current disclosure. Notably, method 800 may be performed by the FMC 110 or more particularly, the energy state depiction component 140 implemented therein. At step 810, the FMC 110 may receive a plurality of vehicle parameters associated with the vehicle (e.g altitude, airspeed, groundspeed, acceleration, vertical speed, heading, pitch, roll, flap & slat position, gear position, etc.). At step 815, the FMC 110 may determine a flight plan or intended path associated with the vehicle. The flight plan or intended path may be stored in a database (i.e., navigation database 130) of the FMC 110, and/or may be input or setup by the pilot. At step 820, the FMC 110 may identify a point of interest (POI) in the flight plan or intended path. In some embodiments, more than one POI may be identified from the flight plan or intended path. The identification of the POI(s) may be based on user selection via the FMC 110. In some embodiments, the POI(s) may be identified without any user intervention, wherein such automatically-identified POI(s) may include all POI(s) or certain predetermined POI(s) along the remaining route. The identified POI may comprise a current location of the aircraft, a flap change/deploy location, a slat change/deploy location, a glide slope intercept altitude, a stabilization altitude (e.g., for both IMC and VMC), a $V_{APP}$ (final approach speed) target location, a $V_{REF}$ (reference approach speed) target location, a final approach fix, an initial approach fix, touchdown point, threshold crossing height, waypoint, or any other user-selected or automatically-identified POI along the planned route. Then at step 825, the FMC 110 may determine one or more trajectories associated with the flight plan or intended path, in order to evaluate the possibility for energy deviation. For instance, the vehicle parameters received at step 810 may be used to predict downpath parameters of the vehicle (i.e., vehicle parameters at the POI(s)). The one or more trajectories may comprise one or more of a vertical trajectory and a lateral trajectory. Information associated with the vertical trajectory may include, but may not be limited to, a vertical velocity and an altitude of the aircraft along various points in the vertical trajectory. Information associated with the lateral trajectory may include, but may not be limited to, a lateral velocity and disposition of the aircraft along various points in the lateral trajectory.

At step 830, the FMC 110 may determine an actual energy height (AEH) at the POI based on the one or more trajectories. At step 835, the FMC 110 may determine a desired energy height (DEH) at the POI based on the one or more trajectories. The determination of the AEH and DEH is described above in greater detail with regards to FIG. 3 and FIG. 5. In some embodiments, the order of steps 830 and 835 may be reversed, or they may be performed substantially simultaneously. At step 840, the FMC 110 may determine an energy ratio, which is the ratio of the AEH to the DEH (AEH/DEH) at the POI. At step 845, the AEH and DEH at the POI are displayed via the display system 180 using various display elements for ease of viewing and interpretation by the user. The various display elements and configurations are described above in greater detail with regards to FIGS. 4A-4B, FIGS. 6A-6C, and FIG. 7. In some embodiments, the speed (i.e., kinetic energy component) and/or the altitude (i.e., potential energy component) corresponding to each of the AEH and DEH may also be displayed via the display system 180.

At step 850, the FMC 110 may determine whether the energy ratio is equal to 1. In some embodiments, the FMC 110 may determine whether the energy ratio is approximately equal to 1, meaning the energy ratio is within a predetermined margin of error from 1. If it is determined that the energy ratio is equal to 1, method 800 may proceed to step 855 where the energy ratio is displayed as an optimal energy level. For example, as illustrated in FIGS. 4A-4B, the energy ratio indicative of an optimal energy level may be represented by an energy ratio indicator 450 of a very small thickness (e.g., a thin line). In one embodiment, a POI represented by a waypoint may be visually coded to signify that the energy ratio is within an acceptable range. For example, the waypoint may appear in its default state when the energy ratio is within the acceptable range (i.e., the default state meaning no change in the visual presentation of the waypoint due to the acceptable energy level).

If it is determined that the energy ratio is not equal to 1, method 800 may proceed to step 860. At step 860, the FMC 110 may determine whether the energy ratio is greater than 1. If it is determined that the energy ratio is greater than 1, method 800 may proceed to step 865 where the energy ratio is displayed per block A in FIG. 9A.

Figure 9A:
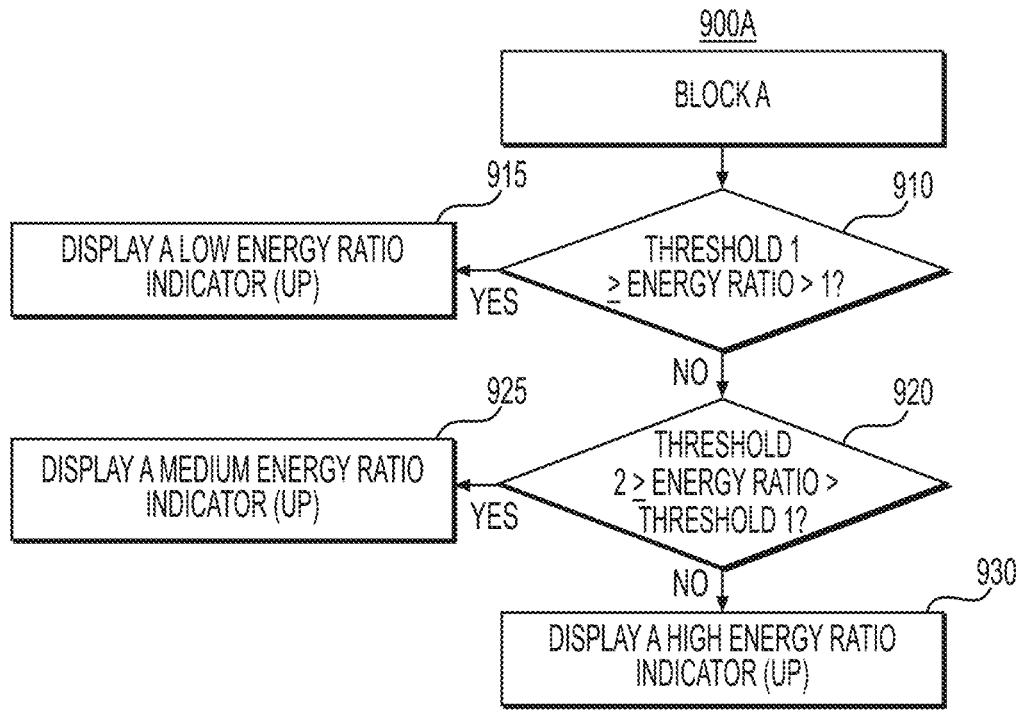
FIG. 9A is a flowchart illustrating an exemplary method of depicting an energy ratio of a vehicle, according to one aspect of the current disclosure.
Figure 9A:
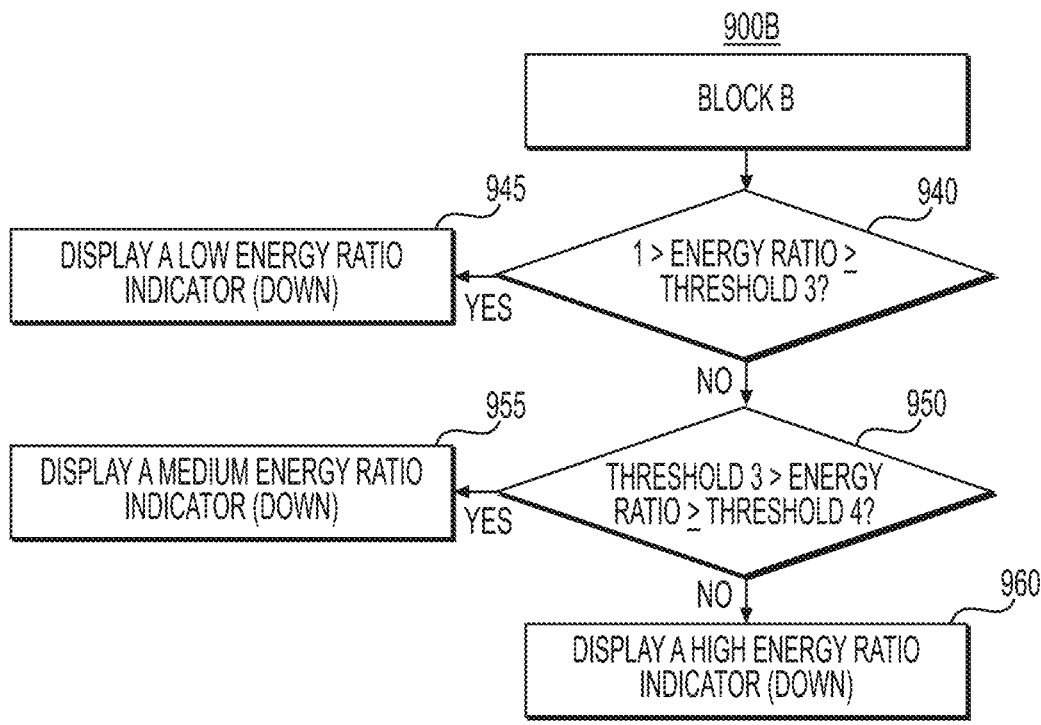

FIG. 9A is a flowchart illustrating an exemplary method of depicting an energy ratio of a vehicle, according to one aspect of the current disclosure. In particular, method 900A may be performed by the FMC 110 (or the energy state depiction component 140 implemented therein) when a determined energy ratio of a vehicle at a POI is greater than 1. After determining that the energy ratio is greater than 1 at step 860 of FIG. 8, at step 910, the FMC 110 may further determine whether the energy ratio is less than or equal to a first threshold. If it is determined that the energy ratio is less than or equal to the first threshold, method 900A may proceed to step 915 where a low energy ratio indicator may be displayed, in a manner described above with regards to FIG. 4A or FIG. 4B. With respect to FIG. 4B in particular, a low energy ratio indicator 440 confined in an AEH indicator 470 may be placed slightly above the optimal energy level (i.e., roughly within the first third of the portion of the energy range bar 460 extending above the optimal energy level). If it is determined that the energy ratio is not less than or equal to the first threshold, method 900A may proceed to step 920 where the FMC 110 may determine whether the energy ratio is greater than the first threshold and less than or equal to a second threshold. If it is determined that the energy ratio is greater than the first threshold and less than or equal to a second threshold, method 900A may proceed to step 925 where a medium energy ratio indicator may be displayed, in a manner described above with regards to FIG. 4A or FIG. 4B. With respect to FIG. 4B in particular, a medium energy ratio indicator 440 confined in an AEH indicator 470 may be placed roughly within the second third of the portion of the energy range bar 460 extending above the optimal energy level. If it is determined that the energy ratio is not less than or equal to the second threshold (i.e., greater than the second threshold), method 900A may proceed to step 930 where a high energy ratio indicator may be displayed, in a manner described above with regards to FIG. 4A or FIG. 4B. With respect to FIG. 4B in particular, a high energy ratio indicator 440 confined in an AEH indicator 470 may be placed roughly within the last, or the uppermost third of the portion of the energy range bar 460 extending above the optimal energy level.

With renewed reference to FIG. 8, if it is determined that energy ratio is not greater than 1, method 800 may proceed to step 870. At step 870, the FMC 110 may determine whether the energy ratio is less than 1. The FMC 110 may have already determined that the energy ratio is less than 1, since the energy ratio has been determined to be neither 1 nor greater than 1 at previous steps 850 and 860. Nonetheless, once it is determined that the energy ratio is less than 1, method 800 may proceed to step 875 where the energy ratio is displayed per block B in FIG. 9B.

FIG. 9B is a flowchart illustrating another exemplary method of depicting an energy ratio of a vehicle, according to one aspect of the current disclosure. In particular, method 900B may be performed by the FMC 110 (or the energy state depiction component 140 implemented therein) when a determined energy ratio of a vehicle at a POI is less than 1. After determining that the energy ratio is less than 1 at step 870 of FIG. 8, at step 940, the FMC 110 may further determine whether energy ratio is greater than or equal to a third threshold. If it is determined that the energy ratio is greater than or equal to the third threshold, method 900B may proceed to step 945 where a low energy ratio indicator may be displayed, in a manner described above with regards to FIG. 4A or FIG. 4B. With respect to FIG. 4B in particular, a low energy ratio indicator 440 confined in an AEH indicator 470 may be placed slightly below the optimal energy level (i.e., roughly within the first third of the portion of the energy range bar 460 extending below the optimal energy level). If it is determined that the energy ratio is not grater than or equal to the third threshold, method 900B may proceed to step 950 where the FMC 110 may determine whether the energy ratio is less than the third threshold and greater than or equal to a fourth threshold. If it is determined that the energy ratio is less than the third threshold and greater than or equal to the fourth threshold, method 900B may proceed to step 955 where a medium energy ratio indicator may be displayed, in a manner described above with regards to FIG. 4A or FIG. 4B. With respect to FIG. 4B in particular, a medium energy ratio indicator 440 confined in an AEH indicator 470 may be placed roughly within the second third of the portion of the energy range bar 460 extending below the optimal energy level. If it is determined that the energy ratio is not greater than or equal to the fourth threshold (i.e., less than the fourth threshold), method 900B may proceed to step 960 where a high energy ratio indicator may be displayed, in a manner described above with regards to FIG. 4A or FIG. 4B. With respect to FIG. 4B in particular, a high energy ratio indicator 440 confined in an AEH indicator 470 may be placed roughly within the last, or the lowermost third of the portion of the energy range bar 460 extending below the optimal energy level.

With renewed reference to FIG. 8, once the energy ratio has been displayed per step 855, step 865, or step 875, method 800 may loop back to step 830 in order to iteratively perform steps 830 through 855, 865, or 875, until the vehicle has reached or passed the POI. Therefore, depiction of the AEH, DEH, and energy ratio may be continuously updated in real-time as the vehicle gets closer to the POI. Accordingly, the display elements corresponding to the AEH, DEH, and energy ratio may also be continuously updated to accurately illustrate the most current energy state information via the display system 180. Further, the current AEH may be compared with the previous AEH (i.e., the AEH determined in the previous iteration) to determine whether the AEH has increased or decreased. Depending on whether the AEH has increased or decreased, the direction to which the energy ratio indicator points (e.g., energy ratio indicator 440 in FIGS. 4A-4B) may be determined. For example, if it is determined that the AEH has increased from the previous AEH, the displayed energy ratio indicator 440 may point outward or upward. Conversely, if it is determined that the AEH has decreased from the previous AEH, the displayed energy ratio indicator 440 may point inward or downward. Further, if the energy ratio goes above a certain threshold, the FMC 110 may send alerts or warnings to the pilot or flight crew via the display system 180 and/or other communication devices such as a tablet, portable computing device, or a cell phone connected to a network.

In an alternative embodiment, in addition to displaying the energy state information via the display system 180, the FMC 110 may automatically determine the best course of action to adjust the energy height of the aircraft to be in line with the desired energy height before arriving at the POI (e.g., decelerate, accelerate, descend, ascend, etc.). Then, the FMC 110 may generate instructions for one or more aircraft components designated to perform the operations associated with the determined course of action. For example, the FMC 110 may generate instructions for flap and/or slat to extend or retract, for aircraft engines to throttle up or down, etc. Prior to executing these operations, the FMC 110 may display the determined operations via the display system 180 for pilot confirmation. The pilot may approve the determined operations, upon which the FMC 110 may execute the instructions to automatically maneuver the aircraft, or the pilot may disapprove the determined operations, upon which the aircraft may enter a manual control mode. In addition, the pilot may manually control the aircraft based on Flight Director (FD) guidance cues presented on the Primary Flight Display that are based on the determined operations discussed above.

Unless specifically stated otherwise, as apparent from the following discussions, it is appreciated that throughout the specification, discussions utilizing terms such as "processing," "computing," "calculating," "determining", analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer," a "computing machine," a "computing platform," a "computing device," or a "server" may include one or more processors.

Figure 10:
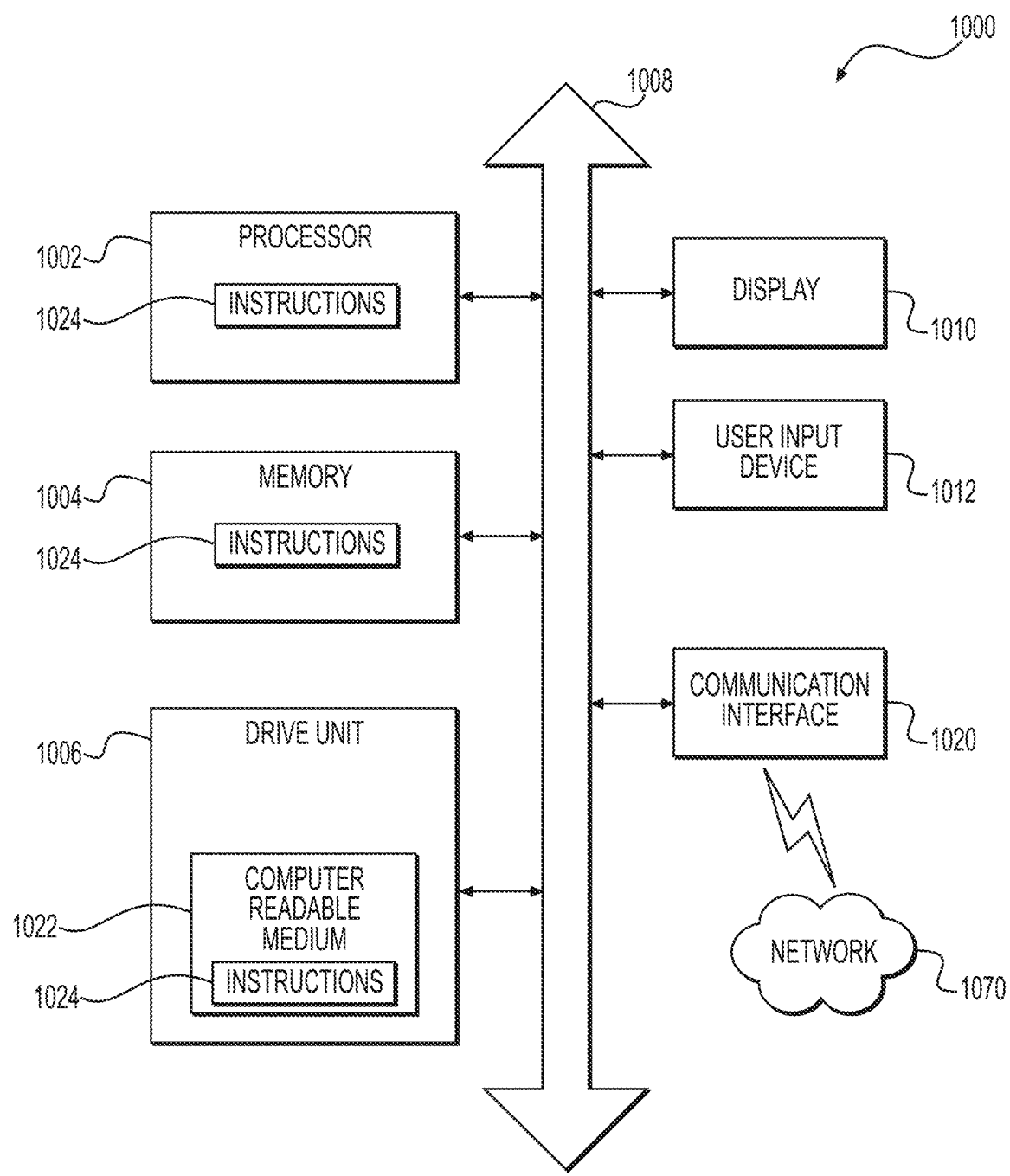
FIG. 10 illustrates an implementation of a computer system that may execute techniques presented herein.

FIG. 10 illustrates an implementation of a general computer system designated 1000. The computer system 1000 can include a set of instructions that can be executed to cause the computer system 1000 to perform any one or more of the methods or computer based functions disclosed herein. The computer system 1000 may operate as a standalone device or may be connected, e.g., using a network, to other computer systems or peripheral devices.

In a networked deployment, the computer system 1000 may operate in the capacity of a server or as a client user computer in a server-client user network environment, or as a peer computer system in a peer-to-peer (or distributed) network environment. The computer system 1000 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular implementation, the computer system 1000 can be implemented using electronic devices that provide voice, video, or data communication. Further, while a single computer system 1000 is illustrated, the term "system" shall also be taken to include any collection of systems or sub-systems that individually or jointly execute a set, or multiple sets, of instructions to perform one or more computer functions.

As illustrated in FIG. 10, the computer system 1000 may include a processor 1002, e.g., a central processing unit (CPU), a graphics processing unit (GPU), or both. The processor 1002 may be a component in a variety of systems. For example, the processor 1002 may be part of a standard personal computer or a workstation. The processor 1002 may be one or more general processors, digital signal processors, application specific integrated circuits, field programmable gate arrays, servers, networks, digital circuits, analog circuits, combinations thereof, or other now known or later developed devices for analyzing and processing data. The processor 1002 may implement a software program, such as code generated manually (i.e., programmed).

The computer system 1000 may include a memory 1004 that can communicate via a bus 1008. The memory 1004 may be a main memory, a static memory, or a dynamic memory. The memory 1004 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 1004 includes a cache or random-access memory for the processor 1002. In alternative implementations, the memory 1004 is separate from the processor 1002, such as a cache memory of a processor, the system memory, or other memory. The memory 1004 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 1004 is operable to store instructions executable by the processor 1002. The functions, acts or tasks illustrated in the figures or described herein may be performed by the programmed processor 1002 executing the instructions stored in the memory 1004. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

As shown, the computer system 1000 may further include a display unit 1010, such as a liquid crystal display (LCD), an organic light emitting diode (OLED), a flat panel display, a solid-state display, a cathode ray tube (CRT), a projector, a printer or other now known or later developed display device for outputting determined information. The display 1010 may act as an interface for the user to see the functioning of the processor 1002, or specifically as an interface with the software stored in the memory 1004 or in the drive unit 1006.

Additionally or alternatively, the computer system 1000 may include an input device 1012 configured to allow a user to interact with any of the components of system 1000. The input device 1012 may be a number pad, a keyboard, or a cursor control device, such as a mouse, or a joystick, touch screen display, remote control, or any other device operative to interact with the computer system 1000.

The computer system 1000 may also or alternatively include a disk or optical drive unit 1006. The disk drive unit 1006 may include a computer-readable medium 1022 in which one or more sets of instructions 1024, e.g. software, can be embedded. Further, the instructions 1024 may embody one or more of the methods or logic as described herein. The instructions 1024 may reside completely or partially within the memory 1004 and/or within the processor 1002 during execution by the computer system 1000. The memory 1004 and the processor 1002 also may include computer-readable media as discussed above.

In some systems, a computer-readable medium 1022 includes instructions 1024 or receives and executes instructions 1024 responsive to a propagated signal so that a device connected to a network 1070 can communicate voice, video, audio, images, or any other data over the network 1070. Further, the instructions 1024 may be transmitted or received over the network 1070 via a communication port or interface 1020, and/or using a bus 1008. The communication port or interface 1020 may be a part of the processor 1002 or may be a separate component. The communication port 1020 may be created in software or may be a physical connection in hardware. The communication port 1020 may be configured to connect with a network 1070, external media, the display 1010, or any other components in system 1000, or combinations thereof. The connection with the network 1070 may be a physical connection, such as a wired Ethernet connection or may be established wirelessly as discussed below. Likewise, the additional connections with other components of the system 1000 may be physical connections or may be established wirelessly. The network 1070 may alternatively be directly connected to the bus 1008.

While the computer-readable medium 1022 is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding, or carrying a set of instructions for execution by a processor or that cause a computer system to perform any one or more of the methods or operations disclosed herein. The computer-readable medium 1022 may be non-transitory, and may be tangible.

The computer-readable medium 1022 can include a solid-state memory such as a memory card or other package that houses one or more non-volatile read-only memories. The computer-readable medium 1022 can be a random-access memory or other volatile re-writable memory. Additionally or alternatively, the computer-readable medium 1022 can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative implementation, dedicated hardware implementations, such as application specific integrated circuits, programmable logic arrays and other hardware devices, can be constructed to implement one or more of the methods described herein. Applications that may include the apparatus and systems of various implementations can broadly include a variety of electronic and computer systems. One or more implementations described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The computer system 1000 may be connected to one or more networks 1070. The network 1070 may define one or more networks including wired or wireless networks. The wireless network may be a cellular telephone network, an 802.11, 802.16, 802.20, or WiMAX network. Further, such networks may include a public network, such as the Internet, a private network, such as an intranet, or combinations thereof, and may utilize a variety of networking protocols now available or later developed including, but not limited to TCP/IP based networking protocols. The network 1070 may include wide area networks (WAN), such as the Internet, local area networks (LAN), campus area networks, metropolitan area networks, a direct connection such as through a Universal Serial Bus (USB) port, or any other networks that may allow for data communication. The network 1070 may be configured to couple one computing device to another computing device to enable communication of data between the devices. The network 1070 may generally be enabled to employ any form of machine-readable media for communicating information from one device to another. The network 1070 may include communication methods by which information may travel between computing devices. The network 1070 may be divided into sub-networks. The sub-networks may allow access to all of the other components connected thereto or the sub-networks may restrict access between the components. The network 1070 may be regarded as a public or private network connection and may include, for example, a virtual private network or an encryption or other security mechanism employed over the public Internet, or the like.

In accordance with various implementations of the present disclosure, the methods described herein may be implemented by software programs executable by a computer system. Further, in an exemplary, non-limited implementation, implementations can include distributed processing, component/object distributed processing, and parallel processing. Alternatively, virtual computer system processing can be constructed to implement one or more of the methods or functionality as described herein.

Although the present specification describes components and functions that may be implemented in particular implementations with reference to particular standards and protocols, the disclosure is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as falling within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted except in light of the attached claims and their equivalents.

What is claimed is:

1. A computer-implemented method for depicting an energy state of a vehicle, comprising:
    receiving, by a flight management computer, a plurality of vehicle parameters associated with the vehicle;
    determining, by the flight management computer, a flight plan associated with the vehicle;
    identifying, by the flight management computer, a point of interest (POI) in the flight plan by receiving a user selection of the POI from a plurality of points of interest (POIs) in the flight plan or automatically identifying the POI from a plurality of POIs in the flight plan;
    determining, by the flight management computer, one or more trajectories associated with the flight plan;
    determining, by the flight management computer, an actual energy height (AEH) at the POI based on the one or more trajectories;
    determining, by the flight management computer, a desired energy height (DEH) at the POI based on the one or more trajectories; and
    displaying, by the flight management computer, the AEH and the DEH at the POI.

2. The computer-implemented method of claim 1, wherein the POI comprises a current location of the vehicle, a flap change location, a slat change location, a glide slope intercept altitude, a stabilization altitude, a reference speed (Vref) target location, a final approach speed (Vapp) target location, an initial approach fix, a final approach fix, touchdown point, a minimum circling approach threshold (MCAT), a threshold crossing height, a waypoint, or any user-selected or automatically-identified POI in the flight plan.

3. The computer-implemented method of claim 1, wherein the one or more trajectories comprise at least one of:
    a lateral trajectory of the vehicle; and
    a vertical trajectory of the vehicle.

4. The computer-implemented method of claim 1, wherein the one or more trajectories comprise a vertical trajectory of the vehicle, the vertical trajectory of the vehicle comprising velocities and altitudes of the vehicle over a course of the flight plan.

5. The computer-implemented method of claim 1, wherein determining, by the flight management computer, the AEH at the POI based on the one or more trajectories comprises:
    determining a predicted altitude of the vehicle at the POI ($Hp_{POI}$);
    determining a predicted velocity of the vehicle at the POI ($Vp_{POI}$); and
    calculating the AEH at the POI based on:

$$Hp_{POI} + (1/(2g)) * Vp_{POI}^2$$

where g is an acceleration due to gravity.

6. The computer-implemented method of claim 1, wherein
    determining, by the flight management computer, the DEH at the POI based on the one or more trajectories comprises:
    determining a desired altitude of the vehicle at the POI ($H_{POI}$);
    determining a desired velocity of the vehicle at the POI ($V_{POI}$); and
    calculating the DEH at the POI based on:

$H_{POI}+(1/(2g))*V_{POI}^2$ where g is an acceleration due to gravity.

7. The computer-implemented method of claim 1, wherein displaying, by the flight management system, the AEH and the DEH at the POI comprises:
    displaying a first bar indicator representative of a degree of the AEH at the POI; and
    displaying a second bar indicator representative of a degree of the DEH at the POI.

8. The computer-implemented method of claim 1, further comprising:
    determining, by the flight management computer, an energy ratio at the POI.

9. The computer-implemented method of claim 8, wherein
    determining, by the flight management computer, an energy ratio at the POI comprises:
        determining a ratio of the AEH at the POI to the DEH at the POI.

10. The computer-implemented method of claim 8, further comprising:
    if the energy ratio is equal to one, displaying the energy ratio as an optimal energy level.

11. The computer-implemented method of claim 8, further comprising:
    if the energy ratio is greater than one,
        displaying a low energy ratio indicator based on determining the energy ratio is less than or equal to a first threshold;
        displaying a medium energy ratio indicator based on determining the energy ratio is greater than the first threshold and less than or equal to a second threshold; and
        displaying a high energy ratio indicator based on determining the energy ratio is greater than the second threshold.

12. The computer-implemented method of claim 11, wherein the low energy ratio indicator is displayed above an optimal energy level, the medium energy ratio indicator is displayed above a level associated with the low energy ratio indicator, and the high energy ratio indicator is displayed above a level associated with the medium energy ratio indicator.

13. The computer-implemented method of claim 8, further comprising:
    if the energy ratio is less than one,
        displaying a low energy ratio indicator based on determining the energy ratio is greater than or equal to a third threshold;
        displaying a medium energy ratio indicator based on determining the energy ratio is less than the third threshold and greater than or equal to a fourth threshold; and
        displaying a high energy ratio indicator based on determining the energy ratio is less than the fourth threshold.

14. The computer-implemented method of claim 13, wherein the low energy ratio indicator is displayed below an optimal energy level, the medium energy level indicator is displayed below a level associated with the lower energy ratio indicator, and the high energy level indicator is displayed below a level associated with the medium energy ratio indicator.

15. The computer-implemented method of claim 1, further comprising:
    displaying, by the flight management computer, at least one of:
        a speed associated with each of the AEH and DEH at the POI; and
        an altitude associated with each of the AEH and DEH at the POI.

16. A system for depicting an energy state of a vehicle, comprising:
    one or more processors; and
    a non-transitory computer readable medium storing instructions which, when executed by the one or more processors, cause the one or more processors to perform
    a method comprising:
        receiving, by a flight management computer, a plurality of vehicle parameters associated with the vehicle;
        determining, by the flight management computer, a flight plan associated with the vehicle;
        identifying, by the flight management computer, a point of interest (POI) in the flight plan by receiving a user selection of the POI from a plurality of points of interest (POIs) in the flight plan or automatically identifying the POI from a plurality of POIs in the flight plan;
        determining, by the flight management computer, one or more trajectories associated with the flight plan;
        determining, by the flight management computer, an actual energy height (AEH) at the POI based on the one or more trajectories;
        determining, by the flight management computer, a desired energy height (DEH) at the POI based on the one or more trajectories; and
        displaying, by the flight management computer, the AEH and the DEH at the POI.

17. The system of claim 16, wherein the one or more trajectories comprise a vertical trajectory of the vehicle, the vertical trajectory of the vehicle comprising velocities and altitudes of the vehicle over a course of the flight plan.

18. A non-transitory computer readable medium storing instructions that, when executed by one or more processors, cause the one or more processors to perform a method for depicting an energy state of a vehicle, the method comprising:
    receiving, by a flight management computer, a plurality of vehicle parameters associated with the vehicle;
    determining, by the flight management computer, a flight plan associated with the vehicle;
    identifying, by the flight management computer, a point of interest (POI) in the flight plan by receiving a user selection of the POI from a plurality of points of interest (POIs) in the flight plan or automatically identifying the POI from a plurality of POIs in the flight plan;
    determining, by the flight management computer, one or more trajectories associated with the flight plan;
    determining, by the flight management computer, an actual energy height (AEH) at the POI based on the one or more trajectories;
    determining, by the flight management computer, a desired energy height (DEH) at the POI based on the one or more trajectories; and
    displaying, by the flight management computer, the AEH and the DEH at the POI.

19. The non-transitory computer readable medium of claim 18, wherein the instructions further cause the one or more processors to perform:

determining, by the flight management computer, an energy ratio at the POI.

\* \* \* \* \*